March 20, 1962     R. P. HOLLAND, JR     3,026,065
SUPERSONIC VERTICAL-RISING AIRCRAFT Filed July 10, 1956     5 Sheets-Sheet 1

INVENTOR
Raymond P. Holland Jr.

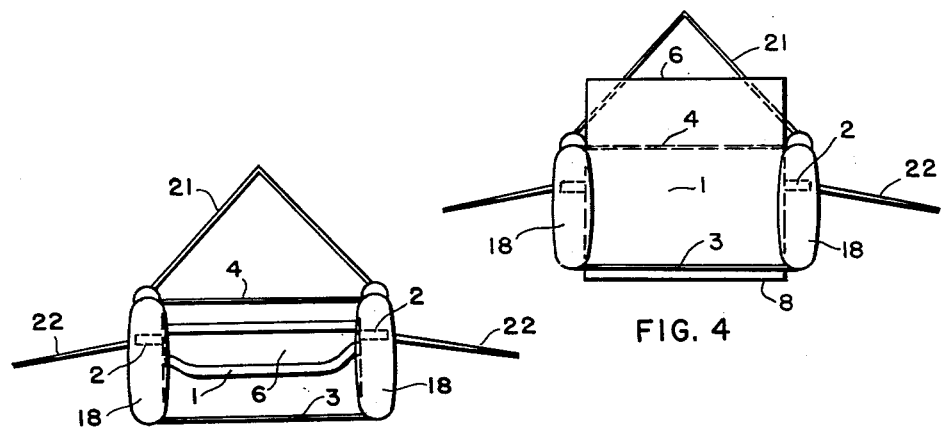
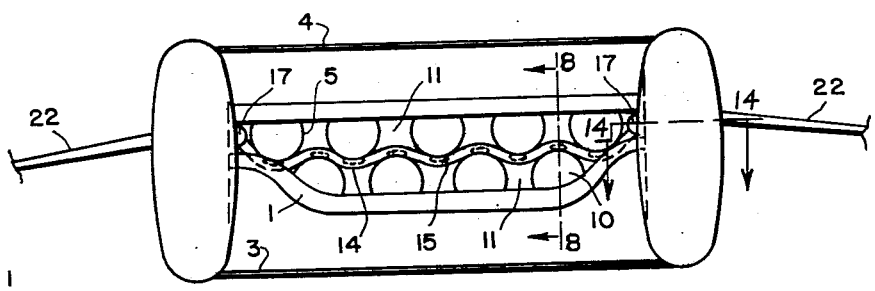
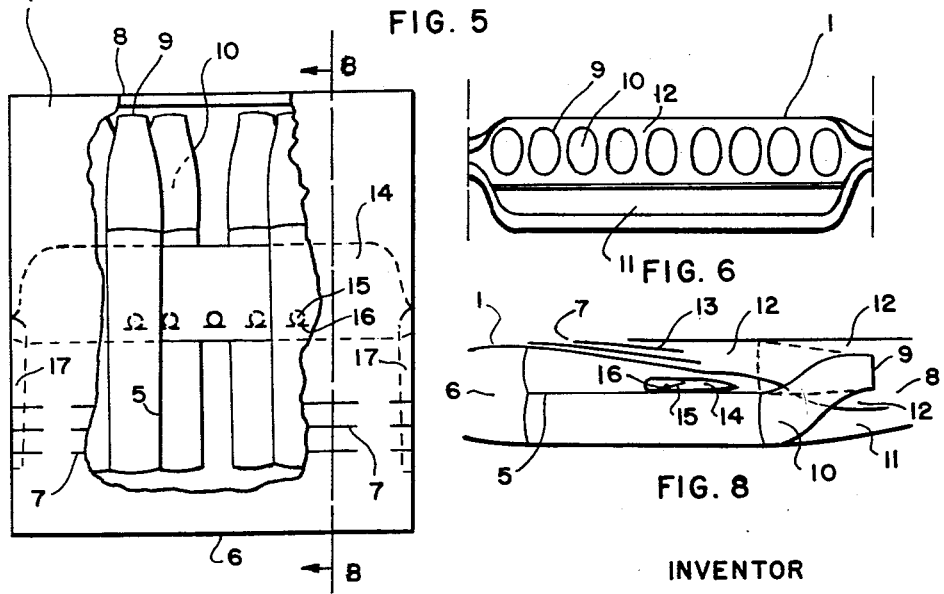

March 20, 1962  R. P. HOLLAND, JR  3,026,065
SUPERSONIC VERTICAL-RISING AIRCRAFT
Filed July 10, 1956  5 Sheets-Sheet 3
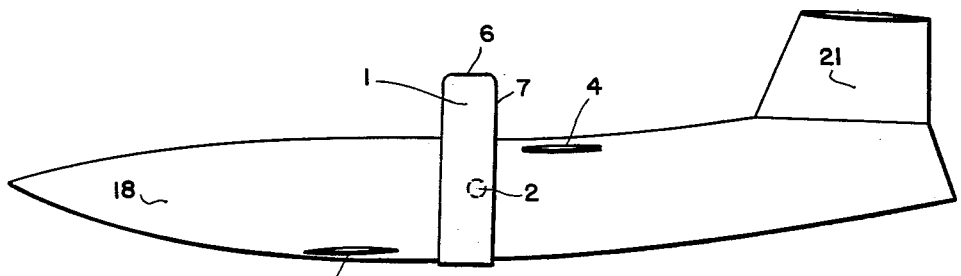
FIG. 9
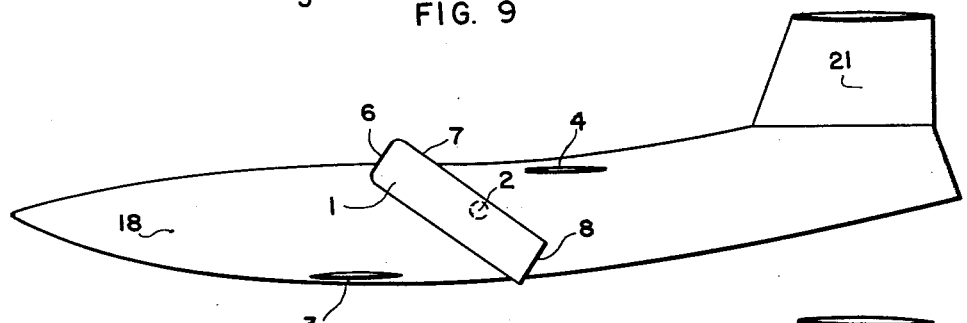
FIG. 10
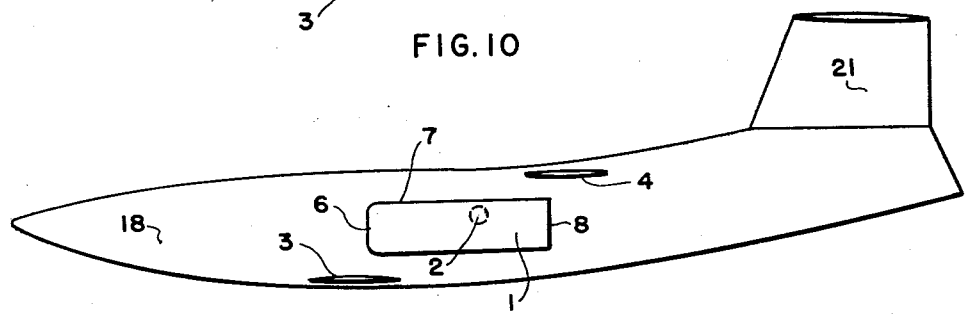
FIG. 11
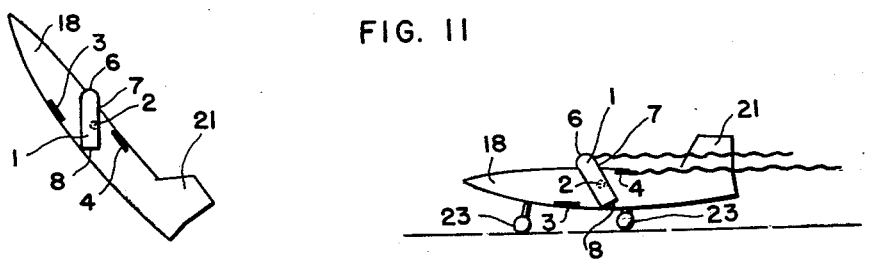
FIG. 12
FIG. 13
INVENTOR
Raymond P. Holland Jr.

March 20, 1962 R. P. HOLLAND, JR 3,026,065
SUPERSONIC VERTICAL-RISING AIRCRAFT
Filed July 10, 1956 5 Sheets-Sheet 4

INVENTOR
Raymond P. Holland Jr.

March 20, 1962 R. P. HOLLAND, JR 3,026,065
SUPERSONIC VERTICAL-RISING AIRCRAFT
Filed July 10, 1956 5 Sheets-Sheet 5

INVENTOR
*Raymond P. Holland Jr.*

3,026,065
SUPERSONIC VERTICAL-RISING AIRCRAFT
Raymond Prunty Holland, Jr., 204 W. College Blvd.,
Roswell, N. Mex.
Filed July 10, 1956, Ser. No. 596,950
12 Claims. (Cl. 244—12)

This invention relates to aircraft and in particular to high speed aircraft having little or no ground run during take-off and landing.

An aircraft may leave the ground vertically or with only a small horizontal movement if the engine thrust is sufficiently strong and is directed upward close to the vertical. The equilibrium of an aircraft supported in this manner depends principally upon the symmetry around its center of gravity of the thrust moments of its engines. When individual engines fail, this symmetry may be destroyed. The propellers of low speed aircraft may be interconnected mechanically to preserve balanced thrust, but on high speed aircraft employing turbojet or rocket engines such interconnection is not feasible, so that it becomes essential to cluster the thrusting tail pipes to produce thrust reactions passing close to the aircraft center of gravity, reducing the eccentric moment produceable by the failure of any one thrust source to a value sufficiently small to be counteracted by a hovering control system of practicable proportions. A further requirement for practical operations of hovering aircraft is a fuselage attitude near the horizontal whenever the aircraft is on or near the ground. In these circumstances, the desirable positions for wing midspan, fuselage, and thrusting engines are in a three-way interference. Furthermore, the resultant engine thrust must rotate between directions parallel to and normal to the fuselage axis. The solutions of these conflicts are contained in this invention.

High speed aircraft exist which are capable of vertical rising from a tail-standing ground position. As a consequence of this ground attitude they are not able to taxi, nor make running take-offs and landings, nor turn on the ground to face the wind conveniently, nor do they permit the usual conveniences of servicing and repair. Furthermore the tail-standing types subject their pilots to an unnatural posture and nearly a complete lack of view during landing, at which time a naturalness of psychological reaction and a full view of surroundings are most needed. Neither can these aircraft operate conveniently on non-level surfaces nor in winds, particularly winds of varying strength, since the position of the landing gear on the earth's surface exerts a control over the direction of the thrust resultant. The aircraft of this invention eliminates these difficulties, and in addition provides a cabin which remains familiarly close to the horizontal such as would be almost essential for passenger transport aircraft.

An aircraft which has insufficient thrust to rise vertically is able to achieve major take-off benefits if it is able to make a running take-off with its thrust elevated at a high angle. For instance, if the static thrust is 90% of the aircraft weight and the engines are elevated 66 degrees above the horizontal, the ground run is only about 28% of the run which would be required if the engines could not be tilted out of the horizontal plane. If the static thrust is 75% of the aircraft weight and the engines are elevated 45 degrees, the ground run for take-off is about 56% of the run otherwise required. In contrast to these performances, jet aircraft are in existence today which develop thrust in excess of their weight but which have no means of elevating that thrust appreciably above the horizontal during their ground runs, and consequently must take-off and land on long runways at dangerously high speeds. They must be designed with wing area in excess of the amount otherwise required, simply to be able to land and take-off with some semblance of safety, at speeds which are actually far from safe, being in the neighborhood of 150 miles per hour. This invention applied to aircraft of this class permits them to land and take-off safely at zero forward speed, and to employ even smaller wings for even faster flight.

This invention contains the greatest promise for aircraft with reaction engines which are capable of supporting their weight by direct thrust. Any such aircraft is inherently of small weight and drag relative to its thrust, enabling it to fly at transonic and supersonic flight speeds, combining in one aircraft both of the long-sought extremes of aircraft performance, the ability to land vertically, perhaps in centers of population, and to fly at extremely fast speeds, for instance between such centers of population. Such an aircraft could travel between major cities on opposite shores of our continent in little more time than that required to travel otherwise by ground from the center of one such city to the outlying airport from which conventional jet aircraft with their long ground runs must operate. This invention makes possible that sort of performance.

It is the primary object of this invention to produce an aircraft which is well suited for flight at transonic and supersonic speeds, which is also suitable for practical operations out of small landing areas, with safety in the event of a partial power failure, and with the fuselage always close to the horizontal so as to produce facility and practicability in such operations.

It is a further object of this invention to provide a tiltable power plant for shortening the take-off run of aircraft, specifically to permit aircraft having a ratio of thrust to weight exceeding unity to take-off vertically, and to permit aircraft having that ratio less than unity to take-off with a run relatively shortened to a degree corresponding to the nearness to which the thrust of the aircraft approaches the weight of the aircraft.

It is another object of this invention to provide a tiltable power plant for shortening or eliminating the landing roll of aircraft.

It is still another object of this invention to produce a means of decelerating aircraft, by tilting an aerodynamic panel containing thrusting engines.

It is still another object of this invention to provide a tiltable power plant containing engines all of which have thrust lines which pass close to the aircraft center of gravity during hovering so as to have acceptably small thrust eccentricity due to the thrusting action of any individual engine therein, and to supply means of delivering power from the tiltable power plant into the aircraft proper for use in counteracting unavoidable thrust eccentricities.

It is still another object of this invention to produce this tiltable thrust and freedom from excessive thrust eccentricity without impairing the wing of the aircraft, aerodynamically, structurally, or functionally.

It is a further object of this invention to provide an arrangement of vertical-rising or slow flying aircraft well suited to the use of a large number of small turbojet engines, utilizing the superior thrust/weight qualities and the relatively small gyroscopic moments of such engines, and achieving a small eccentric moment due to any individual engine.

It is an object of this invention to reconcile the space conflict in vertical-rising aircraft between wing, fuselage and vertically thrusting engines, all of which are preferably centered on the same central point of the aircraft.

It is still another object of this invention to produce an aircraft wing structure employing tension members of extremely thin cross section bracketing and opposed to a thrusting compression member producing a structure aerodynamically suitable for very fast flight while preserving structural efficiency and mechanical suitability for power plant tilting.

It is an object of this invention to produce a wing structure favorably reflecting shock waves, thereby improving the aerodynamic Lift/Drag ratio at supersonic speeds.

Still another object of the invention is to produce a vertically-rising jet aircraft suitable for taxying, running take-off, and other practical ground maneuvers.

Another object is to produce a jet aircraft in which the leading edge of the wing lies below and forward from the engine intake ducts, by their relative positioning preventing the ingestion into the engine of small objects from the ground.

Still another object of this invention is to provide means for preserving streamline flow on the steeply inclined aerodynamic upper surface of a cowling containing reaction engines and to promote streamline flow behind the relatively bluff trailing portion of the cowling when it contains several banks of engines.

Other objects and advantages of the invention will be apparent from the following detailed description thereof, taken in connection with the drawings, wherein:

FIGURE 3 is a head-on view of the same aircraft with the thrusting wing panel in the high speed position.

FIGURE 4 is the same as FIGURE 3 except that the thrusting panel is in the position for vertical thrusting and maximum drag against forward motion.

FIGURE 5 is a front view with the thrusting panel in the high speed position showing the engines and flow passages within the panel.

FIGURE 6 is a rear view of the thrusting panel showing the thrusting tail pipes and the outlets of the flow passages through the panel.

FIGURE 7 is a plan view of the thrusting panel showing engines, tailpipes, and internal ducting therein.

FIGURE 8 is a cross section along section 8—8 of FIGURES 5 and 7 showing engines, tailpipes, and internal ducting including air intakes on the upper surface of the thrusting panel and ducting connecting therewith.

Figures 1, 2:
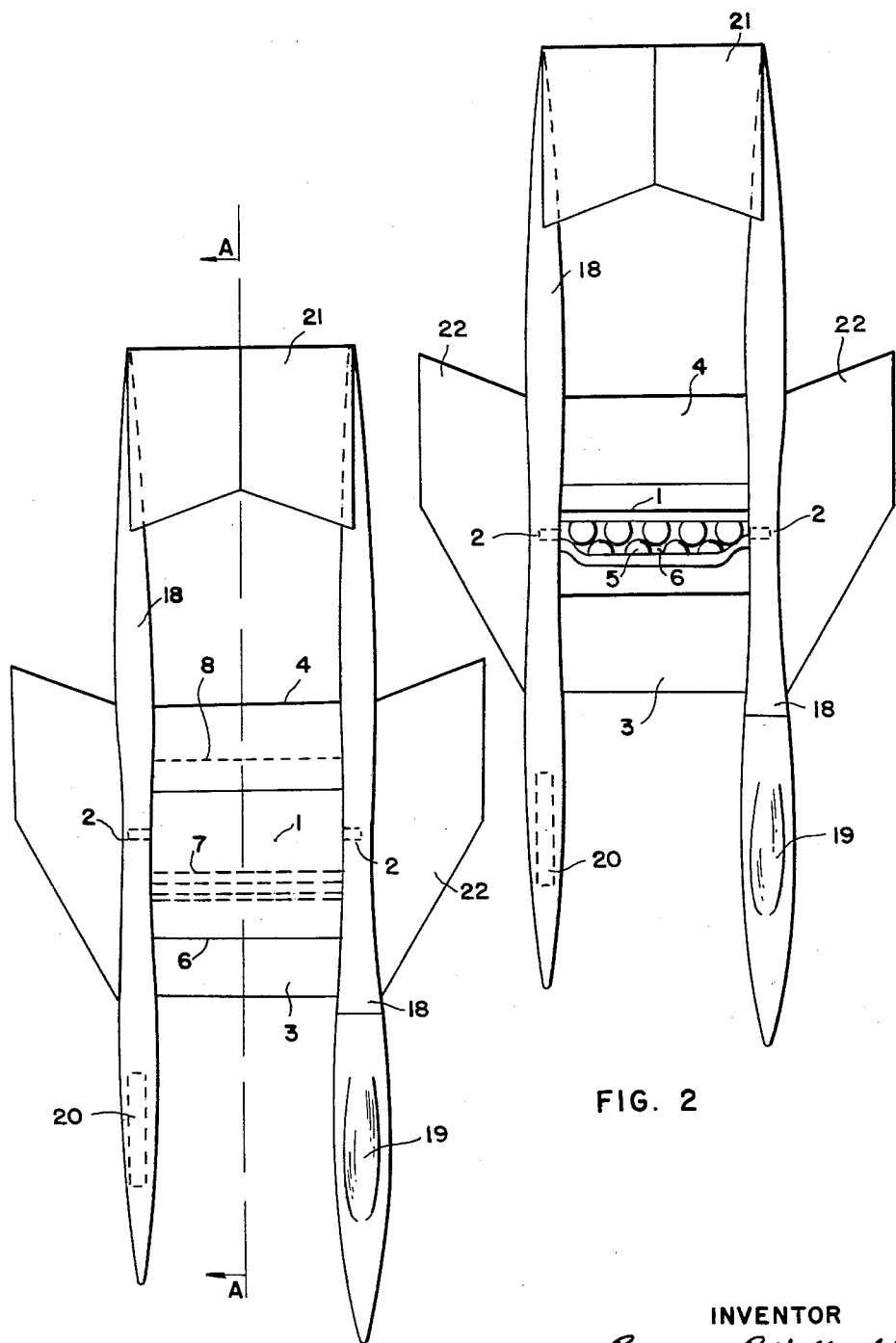
FIGURE 1 is a plan view of an aircraft incorporating the invention, having a thrusting wing panel in the aircraft center section showing the panel in the high speed position.
FIGURE 2 shows the aircraft of FIGURE 1 with the thrusting wing panel in the vertically thrusting position.

FIGURES 9 to 13 inclusive are cross sections along section A—A of FIGURE 1 showing various tilted positions of the thrusting panel in the side view.

FIGURE 9 shows the thrusting panel in position for vertical flight and hovering, and for the maximum production of drag to oppose forward motion.

FIGURE 10 shows the thrusting panel in position for forward acceleration while supporting a substantial portion of the aircraft weight on the engine thrust, alternately for the production of drag for purposes of deceleration or for various transitional flight conditions, some of which are shown in FIGURES 12 and 13.

FIGURE 11 shows the thrusting panel position for forward thrust as a conventional wing-supported airplane, otherwise known as the high speed position.

FIGURE 12 shows the aircraft in transitional flight positions including running take-off, acceleration from hovering toward wing-supported flight, and deceleration from such flight. The dash line represents the ground plane in the case of the running take-off.

FIGURE 13 shows the aircraft rising with the thrust directed vertically upward and with the fuselage inclined steeply nose-up.

Figure 14:
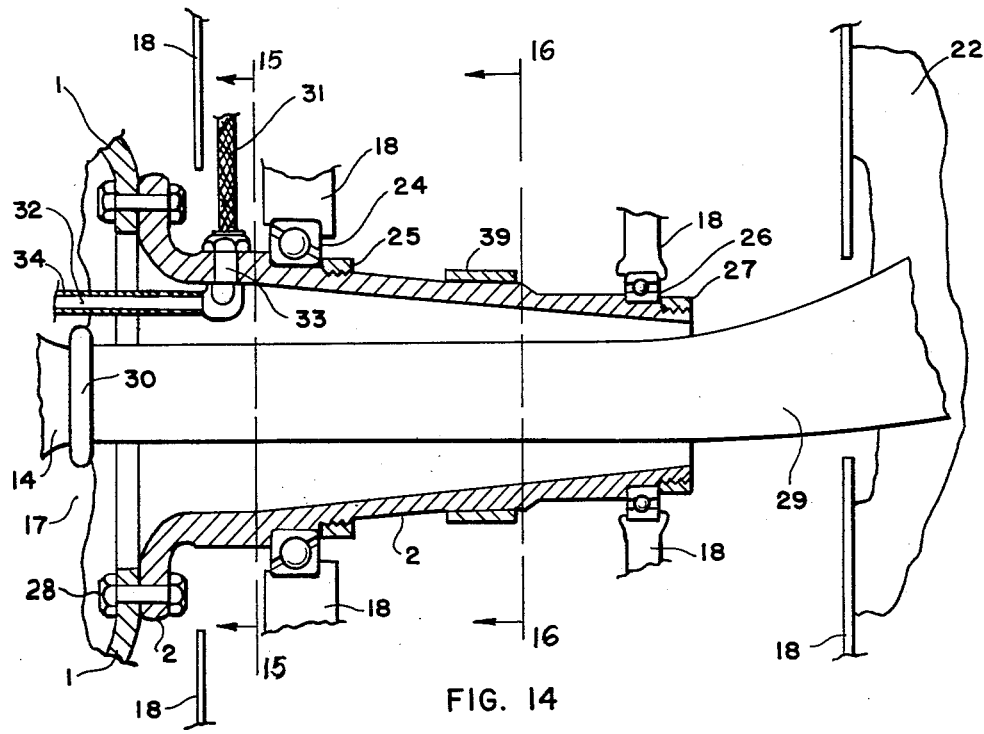

FIGURE 14 is a section at 14—14 on FIGURE 5 taken in a horizontal plane through the pivot at the left side of the thrusting panel where it joins the fuselage showing details of the pivot mechanism.

Figure 15:
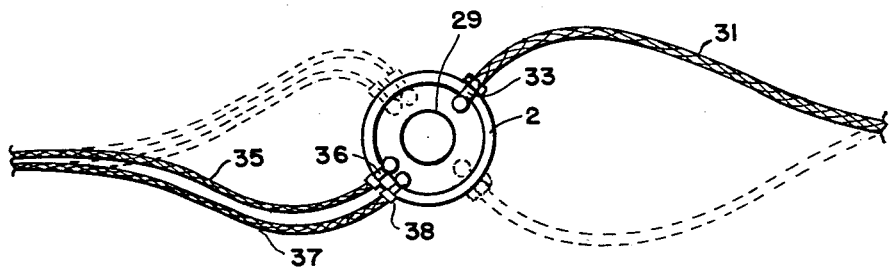

FIGURE 15 is a reduced scale view taken on section 15—15 of FIGURE 14 showing flexible hoses at the pivot.

Figure 16:
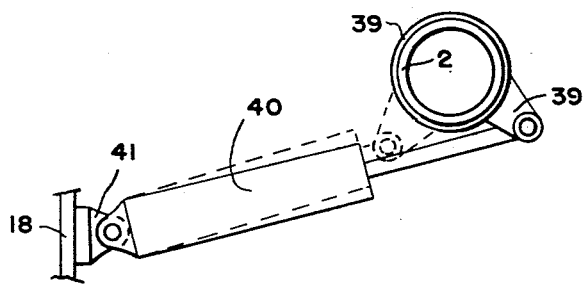

FIGURE 16 is a view along section 16—16 of FIGURE 14 showing the means of mechanical rotation of the thrusting panel.

Figure 17:
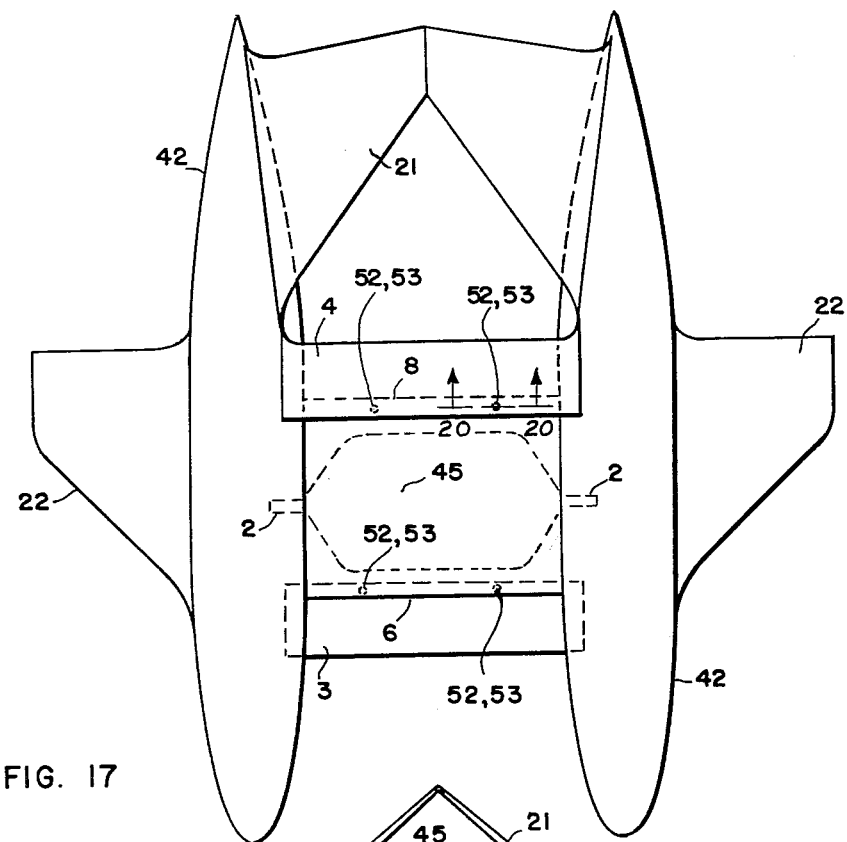

FIGURE 17 is a plan view of an aircraft incorporating this invention having a thrusting wing panel in the aircraft center section, employing by-pass turbojet engines and carrying passengers in a pair of double-deck fuselages.

Figure 18:
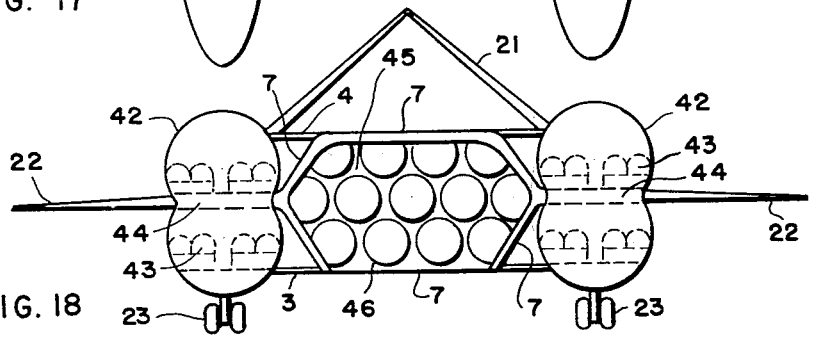

FIGURE 18 is a front view of the aircraft of FIGURE 17.

Figure 19:
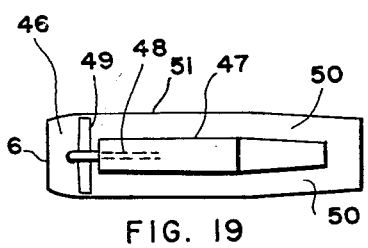

FIGURE 19 is a longitudinal section through one of the engines in the center section of the aircraft shown in FIGURES 17 and 18.

Figure 20:
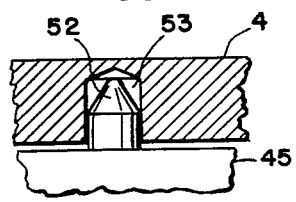

FIGURE 20 is a local vertical through a shear stud and socket which structurally engage the pivoted thrusting panel to fixed wing members when the thrust acts forwardly, in the center section structure, as shown at section 20—20 on FIGURE 17.

The invention consists basically of an aircraft with a thrusting wing panel located near the wing midspan pivoted around a horizontal axis transverse to the flight direction. When the aircraft is in a horizontal flight attitude and the power plant is rotated to thrust vertically upward the resultant thrust passes close to the aircraft center of gravity. The individual engines are grouped so that their individual thrust axes pass closely around the aircraft center of gravity, to avoid large eccentric moments due to non-equal thrusts. The thrust resultant rotates through an angle exceeding ninety degrees, from the rearward of the vertical for deceleration, through the vertical for hovering and vertical flight, forward of the vertical for acceleration forward, to the horizontal for high speed forward, and below the horizontal as necessary for special conditions of design.

The region of the power plant includes a planing wing which may take any one of several forms without departing from the broad spirit of this invention.

For aircraft which permit the use of fixed airfoil members having sufficiently great structural stiffness in bending and torsion, a desirable form of the invention is that in which the airfoil combination in the forwardly thrusting position is a single integral airfoil section lying substantially in a single plane. The power plant air intake is above the leading portion of the wing so formed, and the power plant exhaust is below the trailing portion. A flat S-shaped airflow path is used in the power plant cross section normal to the pivot axis with the intake and exhaust directions offset from a straight through path. In moving to the vertically-rising position, the pivoted power plant pivots upward at the front and downward at the rear, producing a temporarily non-faired aerodynamic form for the vertically-rising portion of the flight.

For transonic and supersonic aircraft in which all cross sections of exposed wing surfaces are preferably nearly flat, the preferred form of the invention employs strap-like aerodynamic planing surfaces of near-zero thickness, in tension, serving as rigid structure across the span of the pivoting power plant. One strap lies forward of the power plant pivot and beneath it, and the other strap lies rearward of the pivot and above it. Their planes are substantially parallel. The power plant in its high speed thrusting position supplies additional planing surface lying substantially parallel. If the power panel is of small depth from top to bottom, viewed from the head-on direction, gaps exist between the horizontal planing surfaces of the thrusting panel and the adjacent surfaces of the fixed straps. The resulting form of the aerodynamic surfaces in the region of the tilting power plant, as seen in an airfoil cross-sectional relationship is a triplane, with negative stagger, with the central plane being the rotatable power plant and with very thin upper and lower wings. On the other hand the use of a deep block-like power panel permits one or more of the gaps between the planes of the triplane to be eliminated, the power panel and strap in that case coming into physical contact, engaging each other mechanically to the extent desirable in the design for mutual structural benefit. Tail surfaces are used to bring the effective aerodynamic center of the entire aircraft to the rearward of the hovering thrust axis, or alternatively the chord of the rearward tension member is extended aft for that purpose. One or another of the tension members may be decreased in size, in the limit case becoming a streamlined tie rod. If both tension members are reduced in this manner, the power panel alone performs the aerodynamic planing function and auxiliary structural members become necessary to produce a complete structure.

These arrangements of wing and power plant are well adapted to aircraft having proportionately large power plants and very small wings. Wing area is not required for landing and take-off and consequently may be extremely small. The flight speed normally exceeds the speed of sound, so that a large wing span is not required as in subsonic aircraft; only sufficient span to provide adequate moment arms for a hovering control system is needed. Such an aircraft becomes extremely fast.

The invention embodies a novel supersonic principle in which wing panels are placed in a multiplane arrangement with negative stagger, with each successive wing in the multiplane located above, rearward and generally parallel to the preceding surface (resembling the top surfaces of successive levels in a flight of stairs), causing shock waves travelling upwardly along paths slanting upwardly and rearwardly from each of the members of the multiplane to be reflected downwardly by a higher unit of the multiplane, producing increased lift on those higher planes, while the shock waves slanting downwardly and rearwardly from each member of the multiplane are permitted to escape downwardly freely. This arrangement produces lift at supersonic speeds while maintaining a small angle of attack, favorable for low drag. Shock waves originating at the exhaust of a propulsive jet produce a relatively strong action of this sort, and the parts of the wing center section are arranged with substantial lateral spans and with exhaust ports spread out laterally across the span of the thrusting panel to achieve an efficient utilization of this effect, approximating a two-dimensional reflection of a wave front in the form of a flat plane.

Clearly, also, as needed for particular designs aerodynamic members may be affixed to the rotatable power panel so as to come into position during high speed flight relative to one or more of the fixed position planing members to produce efficient supersonic inlet diffusers, wave cancellation systems and so on, incorporating existing design knowledge.

For aircraft in which extreme high speed is less desirable than the ability to carry large payloads, favorable use is made of by-pass jet engines, that is, engines which incorporate fans internally mounted in the engine casing for the purpose of increasing the mass flow rate of the propulsive airstream without increasing the engine power. By this means the static thrust per unit power of the engine is increased, permitting increased loads to be lifted, but the thrust at high speeds is not correspondingly increased. Consequently the installation of such engines is best suited to aircraft which seek economy and large payloads at moderate speeds of perhaps 700 miles per hour cruising. In such aircraft relatively large internal fans may be employed, achieving their static lifting benefit without encumbering the aircraft design layout. By employing such a group of engines between a pair of double deck fuselages, generous passenger capacity is obtained, and the mechanical details associated with pivoting the power plant are facilitated. By means of the internal fan feature, the engine blast is reduced, in its mechanical action, its thermal effects and its noise. This simplifies the problems of suitably surfacing landing stages in metropolitan areas, protecting persons in the area from debris thrown by the engine blast, and avoiding public protest against the noise. With such aircraft, made possible by this invention, passenger service between cities lying only several hundred miles apart becomes feasible, operating like motor buses but at speeds in excess of those of the fastest transport aircraft in construction today.

The employment of a large number of engines in a panel which serves as an airfoil section is accomplished by means of novel cowling features. At the higher speeds, it is essential that streamline flow be preserved on the external airfoil-like contours of the panel, and any drag produced by the rear face is to be avoided. When many engines are installed in depth, it is not feasible to taper the external cowling lines above and below those engines to a thin horizontal trailing edge in the manner of a conventional airfoil, because the necessary rate of convergence is too large. To reduce panel depth as much as possible, engines are nested honeycomb style. Air is admitted which is not otherwise required which passes through the interstices between engines, with design advantages for isolating possible local fires, reducing fire risk. This air picks up engine heat and tends to expand after which it passes out through the rearward outlet port. By this means both the mouth and rear port of the cowling are enlarged. On high speed aircraft capable of developing sufficient ram pressure, fuel may be burned by conventional means in the rear portions of these ducts, expanding and accelerating the outlet gases, obtaining thrust therefrom, and further enlarging the outlet port. To make possible efficient arrangements in which engines are stacked deep in place thereof, additional air passes through the panel outlet port which does not enter through the mouth. This air is obtained through the upper and lower surfaces of the panel, entering through expanding flush contour ramp inlets, being retarded internally to develop pressure and pick up engine heat, and emerging out of the rear port from a duct outlet which surrounds the propulsive stream outlets, in which region the propulsive stream mixes with the air so obtained, accelerating it downstream. This arrangement accomplishes the effect of convergence of the overall propulsive stream without requiring the usual convergence of the body housing the engines. It accomplishes the streamlining function by means of internal ducting. It interposes a stream of relatively cool air around the primary engine tail pipes. It produces an exhaust ejector arrangement which absorbs some of the energy of the primary exhaust stream before that issues from the panel, thereby reducing exhaust noise, temperature, and mechanical blast. It also performs a flow guiding function during slow flight when the aircraft is supported principally by engine thrust, but when some forward speed exists and the power panel is inclined in a nose-up attitude. At that time the air pressures around the wing due to translational motion are not large and a small volume flow is sufficient to govern external flow patterns. A pumping action is caused by the engine exhaust issuing from the tail pipes mixing with the air in the outlet of the ducts. Air is drawn into the duct inlet from the upper rearward sloping surface of the panel from which it would otherwise separate, achieving a variety of boundary layer control, thereby preserving streamline flow at least over the leading edge portions of that steeply inclined surface. On aircraft having thrusting panels of sufficiently small depth to employ cross-stream air intakes of this sort on one surface only, these are located on the top surface to concentrate the boundary layer sucking action on that surface which is the only surface susceptible to flow separation.

Stresses are transmitted through the region of the pivoted panel. The panel itself is well adapted to carry compression loads applied parallel to the pivot axis by virtue of its deep and broad structural form, aided by end fixity in the pivot bearings. These same features make it well suited for carrying shear forces and bending moments normal to the pivot axis. Torsional displacements of structure lying on the two lateral sides of the pivoted panel are prevented by means of laterally connecting structure external to the pivoted panel. In applications to subsonic aircraft such a lateral structure may take a wide variety of forms, but in transonic and supersonic aircraft the preferable form for a lateral center section member is the previously mentioned extremely thin ribbon-like tension member, employing its planview area as a planing surface. This strap is preloaded in tension, enabling it to carry edgewise shear and edgewise bending without buckling, and permitting it to encounter a temperature rise due to aerodynamic heating prior to becoming structurally or aeroelastically ineffective.

In the preferred high speed configuration a pair of tension straps bracket the compression member. At each lateral end the two straps and the compression column mount in a common rigid member integral with the aircraft frame. Adequate bending restraint is achieved across the panel against moments due to forces acting in a plane containing the column pivot and intersecting the strap member carrying tension in the particular loading. Normal to that plane, however, the only bending restraint is produced by the component of the edgewise bending stiffness of the straps and by the bending stiffness of the compression member itself. Hence, to obtain a large contribution from the edgewise bending of the straps in this loading, it is preferable for the rearwardly located strap to be located high relative to the pivot and to be located well forward, in the region above the trailing edge of the rotatable panel, when that unit is in its high speed position. Similarly, it is desirable for the forward strap member to be located low and aft. So arranged, edgewise to the high speed flow, and pre-loaded in tension, adequate bending stiffness is achieved in both co-ordinate directions. Relative shear displacements in the horizontal plane are prevented by the edgewise shear stiffness of the ribbon-like tension members. Shear displacements in the vertical direction are prevented by the restraint in shear and local bending of the pivoted panel mounted with end fixity in the laterally adjacent rigid structure. A high degree of torsional rigidity is achieved in various types of aircraft by various means such as the lambda tail when twin fuselages are used, or positive structural engagement of the pivoted panel with the tension straps.

The lambda tail accomplishes the above desired results adapting to structural purposes the tail surfaces which are required in any case for aerodynamic stability and control. Employing twin fuselages having a high degree of rigidity in their after portions, the horizontal tail surfaces are arranged as a letter lambda, as seen in front view, with the root ends of the tail panels mounting rigidly on the aft ends of the fuselages and the tip ends of the panels mounting rigidly together forming an angle usually between 30 and 60 degrees, depending on the structural results desired and the relative amounts of effective vertical and horizontal tail area required. The aerodynamic action of this tail resembles that of the well known V-tail, with the additional improvement that the fuselage volumes are located at the aerodynamic tips where they are effective as end plates, whereas in the V-tail the fuselage is located ineffectually at the intersection of the surfaces. The lambda tail has the additional feature that it supplies a negative dihedral action. It also places the tail surfaces in a high position, relatively free of turbulent wakes. Structurally, the lambda tail achieves a torsionally rigid interconnection between a pair of stiff fuselages spaced apart laterally and pivoted to each other freely around the axis of the pivoted thrusting panel. With the rigid fuselages restrained by the tension straps to parallel planes normal to this pivot axis, and with the structure viewed from the front or rear, two sides of a triangle are formed by the lambda tail members and a virtual third side can be visualized connecting the fuselages, since the fuselages are not free to move laterally. The triangle so formed is restrained against rocking side to side, since this would require torsional deflection in both fuselages. The effect is strengthened by the existence of chordwise depth in the lambda tail panels. Each lambda section at an increasing distance from the pivot axis connecting the fuselages would be subject to an increasing amount of fuselage motion if the fuselages were freed to move around the pivot. This introduces torsion into the lambda panels themselves. Analysis indicates that if the fuselages are to take a relative angular displacement in pitch, these panels must deflect in tension, compression, bending and torsion. Stiffness in all these loadings produces good rigidity of alignment between the fuselages even with fuselages which themselves are not unusually rigid.

On aircraft having relatively deep power panels the final motion of the rotating power panel into its forwardly thrusting position brings it into physical contact with the tension straps. The lower leading surface of the panel bears down on the forward lower strap, and the upper rearward surface bears upwardly on the upper rear strap. In both locations the contours fair together for streamlined high speed airflow. Torsional deflections of the tension member are prevented in the region of contact. The straps engage the structure of the panel by means of studs and sockets rigidly interconnecting the surface of the tension member on the surface of the panel, preventing any relative sliding motion between the two, thereby locking these members together in a block-like structure able effectively to resist torsion across its span. In the hovering and low speed flight configurations, the straps and panel are not in contact and these structural advantages do not apply, nor are they necessary at those times since the stresses and excitations in slow speed flight are small compared to those occurring at high speed.

The rigid structure lying laterally at the sides of the pivoted thrusting panel may consist of a rigid rib structure within a conventional wing panel or it may take the form of twin fuselages. It is necessary that either the power plant be divided symmetrically on either lateral side of a central fuselage, or that the fuselage function be split so as to bracket the power plant laterally. The use of twin fuselages is ordinarily the preferably structure. Without the addition of any appreciable amount of structural weight over that already required, twin fuselages are capable of transmitting torsional stresses due to the eccentric application to the fuselage of the tension in the tension members, of delivering bending moments from the wing tip panels into the triplane center section wing structure lying between them, and of loading the tilting power plant in compression as a consequence of the tension in the upper and lower members of the triplane center section. By providing adequate volume they facilitate the mounting of the center section pivot, the various ducts, fuel lines, instruments lines and engine controls which pass through the pivot, and the housing of the mechanism for tilting the center section.

For taxying and ground operations the power plant is ordinarily horizontal and the operations are identical to those of a conventional airplane. For a running take-off, the power plant is elevated to an angle above the horizontal which is greater as the available thrust from the engines approaches the aircraft weight.

In a vertical take-off the aircraft elevates its thrust vertically and rises. In some cases, the thrust will be kept slightly forward of vertical to produce a slight forward motion to prevent runway damage from the heat and blast of the engine exhaust and to stay forward of ground debris raised by the blast. Once airborne above obstacles, the power plant is tilted progressively forward. Lift is generated at once on the fixed position wing surfaces, which are suitably inclined at a small nose-up angle by means of aircraft pitching controls not described. As this lift develops the vertical component of thrust is reduced in favor of a greater forward component. This is in contrast to other aircraft types sometimes advocated for vertical flight in which the beginning of forward motion is accompanied by an increased demand on the thrust of the engines. Generalized computations show that with thrust rotated only 12 degrees forward of the vertical in which position 98% of the thrust is effective in the vertical direction, if the aircraft accelerated horizontally until its speed stabilized, it would develop a total lift twice as great as its weight. Thus a comfortable excess of lift or thrust comes into existence as soon as forward motion begins. A practical take-off procedure, therefore, is to rise vertically, tilt the engines slightly forward, and gain speed forwardly and upwardly, progressively raising the nose of the aircraft and tilting the engines downwardly until alignment of engines and fuselage is achieved with the aircraft climbing at high speed at around 45 degrees to the horizontal.

Deceleration from high speed flight is a major consideration with fast aircraft, in that the letdown prior to landing tends to increase speed, and many miles are traveled with a clean dense aircraft even though no power is applied, before the speed becomes slow enough for a safe landing. When the landing is to be made at zero forward speed as in the present aircraft, the means available for deceleration are of increased importance. In this invention, the initial deceleration from high speed is achieved by tilting the power plant at a small angle to the fixed wing surface, achieving an aerodynamic twist through the wing midspan producing aerodynamic drag. As the decelerative tilt of the power panel increases local flow separations develop between the upper surface of the tilting wing panel and the lower surface of the upper fixed wing producing a turbulent wake in the manner of split flap dive brakes. At still slower speeds, the power panel is elevated normal to the flight direction. As the power panel approaches the vertical position, full thrust is resumed and is tilted rearward for the final elimination of forward speed, with the aircraft nosed down as necessary to keep it from climbing. The momentum of the flight having been eliminated, the aircraft is maneuvered into its landing position and lands vertically downward with its fuselage horizontal, by controlling the strength of the thrust and by controlling the flight attitude with the hovering control. Rolling landings are made in a similar manner but with forward speed maintained to whatever degree may be necessary or desirable.

It is significant that throughout the non-hovering portions of the flight the only surfaces which experience flow separation are centrally located on the aircraft, where they cannot appreciably disturb the equilibrium of the aircraft.

The aircraft as a whole is controlled by tilting the thrusting panel to obtain vertical or forward motion and by the use of reaction controls not shown for hovering and low speed and the use of trailing edge flap control surfaces for high speeds, as are well known.

Referring now specifically to the drawings, two aircraft are shown which incorporate this invention. In the first, thrusting wing panel 1 rotates on pivots 2 at its lateral ends and forms the central portion of the wing center section structure, lying laterally between wing tip panel members 22. That is, when seen from above (FIGURES 1 and 2), panel 1 lies at an intermediate position, with a wing tip panel 22 on one side and the other wing tip panel 22 on the opposite side. The forward part of the wing center section structure is formed by fixed position horizontal aerodynamic planing surface 3, and the rearward part is formed by fixed position horizontal planing surface 4. (Surfaces 3 and 4 are the strap-like members previously mentioned.) Within pivoted panel 1 is installed a multiple jet reaction power plant. Engines 5, in two layers, produce a concentration of thrust in the central portion of the wing and produce an aircraft having small frontal area and a large power plant. A loss of thrust during hovering by any one of engines 5 produces no appreciable change of pitching moment on the aircraft and produces a rolling moment small enough to be counteracted by a hovering control system of moderate size. Planing surface 3 lies forward of panel 1, on a lower plane. Surface 4 lies aft of panel 1 on a higher plane. The planes of surfaces 3 and 4 are parallel. The pivot axis connecting pivots 2 lies linearly between surfaces 3 and 4 and extends parallel to their spanwise directions. For the purposes of this specification the meaning of "linearly between" is as follows: If a straight geometric line in space passes from a point on a member A to a point on a member B and passes, in the space between these two, through a member C, then member C is "linearly between" members A and B. For example, on FIGURE 11, pivot axis 2 is linearly between panel 3 and panel 4. Panel 1 rotates on pivot axis 2 through the open space between surfaces 3 and 4, directing its thrust direction rearward of vertical at one extreme and lower than horizontal at the other extreme. Several of its positions are shown in FIGURES 1 through 4 and FIGURES 9 through 13. In all of these positions thrusting wing panel forward inlet mouth 6 and power panel cross stream inlets 7 are unobstructed in receiving inlet airflow, and thrusting wing panel rearward outlet port 8 is unobstructed in exhausting a thrusting stream of reaction gases. Inlets 7 are flush with the faired upper surface of panel 1 and open within that surface a short distance downstream from the leading edge of panel 1, and prevent separation of the external flow across that panel, as described hereafter. When panel 1 is in its forward thrusting position, as shown in FIGURES 1, 3, 5, and 11, it forms an aerodynamic combination with fixed position planing surfaces 3 and 4, the three members together serving as an airfoil, producing flight sustaining lift during forward flight with a minimum of aerodynamic drag. Surfaces 3 and 4 are extremely thin in section and sharp on their leading edges rendering them suitable for flight at supersonic speeds. Panel 1 admits inlet air throughout forward mouth 6 which is nearly as large as the maximum frontal area of panel 1, and exhausts propulsive air in an accelerated directed stream out of its rearward outlet port 8, so that its frontal area is no detriment to high speed flight although its appearance is bluff. Panel 1 serves as a planing surface as effectively as do surfaces 3 and 4. It bridges the gap which would otherwise exist between these surfaces, resulting in a structural wing center section which is a powered supersonic negatively staggered triplane airfoil combination. The lower face of surface 4 reflects shock waves originating at rear port 8 in supersonic flight, obtaining lift thereby. In general, shock waves rising from surface 3 are reflected downward from the lower surface of panel 1 and shock waves rising from panel 1 are reflected downward from surface 4, increasing lift.

Air is admitted to thrusting wing panel 1 through forward facing mouth 6 and cross-stream inlets 7, and is exhausted through outlet port 8. A portion of the airstream entering inlet 6 passes internally to engines 5 for combustion and is exhausted at high temperature through multiple tailpipes 9, and thereafter through outlet port 8. The overall passage through the engine and tail pipe combination is indicated as engine air passage 10. Another portion of the air entering panel mouth 6 passes between engines 5 following air passage 11, exhausting through outlet port 8. The inlet air admitted through flush cross-stream inlets 7 passes through cross-stream duct 12 which encloses the outlets of tail pipes 9 near its downstream end a short distance upstream from its outlet into rear port 8. In the upstream end of cross-stream duct 12 are located flow-splitter vanes 13 having their leading edges nearly tangent to the top surface streamwise contour lines of panel 1, producing flush inlets, then bending gently downward as they pass rearwardly into duct 12, producing gently turning and expanding air passageways adjacent to vanes 13 at the inlet of duct 12.

This system of ducts within panel 1 contributes to the airfoil action of panel 1, preserving streamline flow on the upper and lower surfaces of panel 1 and downstream from its outlet port 8. To preserve low drag at high speeds the upper and lower external surfaces of panel 1 must remain relatively flat and parallel throughout their streamwise lengths. In particular the upper surface must be straight and flat where it lies beneath and parallel to planing surface 4. To obtain flat flow-wise contours, mouth 6 and outlet port 8 must be sufficiently large to occupy nearly the entire frontal area and must approach sizes equal to each other. Both faces are large by virtue of air passage 11, portions of which, however, must be kept sufficiently small to develop ram pressure in the more upstream portions of the duct, and in particular to avoid any unnecessary ram pressure loss at the compressor inlets of engines 5. Passage 11 permits air to pick up ram heat within the interior of panel 1 where it is under ram pressure and exhausts it rearward to gain a thrust increase. In design, to enlarge rear port 8 further, provision may be made to burn fuel in the duct in the manner of a ram jet. Air passage 12 enlarges rear port 8 to practically any desired degree but does not enlarge inlet face 6 since it admits air from the top of the cowling. The action of cross-stream duct 12 is analogous to the conventional convergence of the external streamlines toward a thin horizontal edge on a wing, with the important difference that conventional external flow is not restrained by walls as is the case here. External flow is therefore subject to breakdown of the external streamlines from well known causes, whereas the flow within a duct is accurately controllable and may be engineered for a low and predictable value of energy loss. A further distinction exists in this analogy in that a pumping means is available in the construction shown here which is not available to free stream flow, namely the action of the reaction gases issuing from tailpipes 9 mixing with the air in the downstream end of duct 12, carrying that air downstream, contributing to the entry of air into inlets 7 at the upstream end of duct 12, removing the boundary layer of the external flow in that region and preserving non-stalled external aerodynamic flow. In slow flight when direct engine thrust is largely sustaining the aircraft and when panel 1 is elevated in positions as shown in FIGURE 12 the pumping action through duct 12 is strong relative to the pressures and volume flows in the external airflow adjacent to panel 1, enabling the intake flow through inlets 7 to influence the external streamlines due to forward motion around panel 1. The area in which the boundary layer is to be controlled on panel 1 is small permitting a small volume flow to suffice. In FIGURE 12 the upper wavy line streaming rearward from the top of panel 1 represents the upper boundary of the separated flow in the absence of this flow control action. The lower wavy line represents the top of the separated flow with flow being sucked into inlets 7 as described. A further lowering of the wavy line is not accomplished in this case because of the sharply diverging flow passage formed between the lower surface of fixed planing surface 4 and the upper rear portion of panel 1 when in this inclined position, a feature which is required at other times for braking. When the aircraft is on the ground and the power plant is operating, the mixing of exhaust gases from tail pipes 9 in the outlet port 8 draws flow through duct 11 and maintains a ventilating and cooling airflow throughout thrusting panel 1.

Manifold 14 in panel 1 receives air from engine passages 10 just downstream from the engine compressors. This air passes through ports 15 which are equipped with spring actuated hinged doors 16, which are free to open in response to pressure from the engine side, and spring loaded to close in the opposite direction, and which seal ports 15 in response to pressure from the side of manifold 14. Manifold 14 serves as a plenum chamber gathering compressed air from all active engines for distribution laterally into the aircraft proper. Ducts 17 open forwardly within inlet mouth 6 of panel 1 and take in air for cooling the portion of manifold 14 which lies adjacent to the lateral pivots, and for cooling the adjoining ducts which lie beyond, as described below. The main central portion of manifold 14 is cooled by air passing through passages 11. The form of manifold 14 through this central portion, as seen in front view, is a flat undulating ribbon affording ample surface area and volume without excessive frontal area. The major use for this ducted compressed air is for a hovering control system, a system which may be of small size to the same degree that the maximum eccentric moment due to any single engine is kept small.

Panel 1 rotates on pivots 2, each of which is mounted in a laterally located fuselage 18, one of which contains detachable crew quarters 19, and the other of which contains automatic detection and control equipment 20. At the rear extremities of fuselages 18, extending laterally between them are tail panels 21 joined rigidly to each other at their top edges on the median plane of the aircraft in the form of the Greek letter lambda when viewed head on. At each lateral wing tip of the aircraft is located a conventional fixed position wing tip panel 22.

The wing member of the aircraft in its total function, structurally and aerodynamically, consists of wing tip panels 22, center section planing surfaces 3 and 4, pivoted panel 1, pivots 2, and those portions of fuselages 18 which are contiguous to these parts and are located within the general planview outline of these parts collectively. The rigid portion of this wing member consists of all these parts except the pivoted thrusting portion, panel 1, and the parts which actuate the pivoting displacement of that panel.

Beneath each of the two fuselages 18 are two retractable wheels 23, one located forwardly and one located rearwardly from pivot 2.

The center of gravity of the entire aircraft lies approximately on the axis extending between pivots 2, in the midspan of the wing at a point midway between the two pivots. This point is near the aerodynamic center of the total wing member, defined above. The concurrent position of the center of gravity and the pivot axis central point lies somewhat rearward in this particular configuration from the aerodynamic center of the wing system as described. However, in this case and in all cases it lies forward from the aerodynamic center of the entire aircraft including tail surfaces 21 or their equivalents, and the fuselages. The equivalents of horizontal tail surface 21 might take the form of additional conventional horizontal tail surface area or of extra planing surface area added to the trailing edge of planing surface 4, or to wing tip panels 22.

The novel features of this invention affecting structural strength and rigidity are contained in the center section portion of the aircraft, specifically, inboard from wing tip panels 22, and rearward from the leading edge of planing surface 3. The portion of this structural center section which is wing center section structure lies forward of the trailing edge of planing surface 4. In this region, surfaces 3 and 4 are preloaded in tension and panel 1 is preloaded in compression. Pivot axis 2 lies somewhat closer to surface 4 than it does to surface 3, producing relatively greater preload in 4, since that is the surface which tends to go slack in the severest loadings. The combination of members 1, 3, and 4 serve to resist bending moments across the wing between the fuselages both in the normal bending directions and in fore-and-aft bending. Bending due to forces acting normal to a plane containing the centroids of the cross sections of members 3 and 4 is resisted by components of edgewise stiffness of members 3 and 4 and by the bending stiffness of panel 1. Shear forces acting to displace one fuselage upwardly relative to the other is resisted by shear restraint across panel 1.

The reactions to the above loadings are assisted by the stiff aft portions of fuselages 18 communicating stresses to the lambda tail. A tendency for one fuselage to tilt nose upwardly relative to the other around pivots 2 is resisted predominately by the aft fuselages which are stiff in both bending and torsion, which are held parallel by the action of the strap-like planing surfaces 3 and 4 bracketing panel 1, and by stresses across the lambda tail. In this loading the panel of the lambda tail which tends to rise carries compression, the opposite panel carries tension, and both panels carry normal bending and torsion, effectively putting to work the structural material which must be present in any case in the tail surfaces for aerodynamic functions.

As shown in FIGURE 14, pivot 2 is a tapered machined forging, mounted in thrust bearing 24 which resists the lateral thrust of panel 1 and transmits the force to a rigid structural member fixedly attached to fuselage 18. Retainer nut 25 holds bearing 24 in place on pivot 2. Radial bearing 26 acts with bearing 25 to transmit shears and bending moments between panel 1 and fuselage 18. Retainer nut 27 holds bearing 26 in place on pivot 2. Bolts 28 mount pivot 2 rigidly to the frame of panel 1. These parts together with fixed aerodynamic planing surfaces 3 and 4, which are rigidly attached to fuselages 18, form a rigid closed frame around pivoted panel 1.

Coaxially through the open central portion of pivot 2 duct 29 conveys energized gas from manifold 14 previously described. Concentric sliding joint 30 seals the gap between manifold 14 and duct 29 and allows these two parts to rotate relative to each other when panel 1 rotates relative to fuselage 18. Various flexible hoses and lines serving as fuel lines, instrument lines, engine controls, and similar functions pass between the stationary fuselage and the rotating panel. Flexible fuel line 31 is mounted in fuselage 18 in a plane perpendicular to the axis of pivot 2 with a length of free line adjacent to pivot 2. It is attached to fuel line 32 which is stationary relative to pivot 2, by means of rigid coupling 33, which passes through the wall of pivot 2 in a direction square to the axis of rotation of pivot 2. Fuel line 32 is covered by insulation 34. The hollow internal portion of pivot 2 communicates with duct 17, previously described, producing a flow of cooling air over duct 29, emptying into fuselage 18. Rotations of pivot 2 relative to fuselage 18 produce bending in fuel line 31 in a single plane normal to the axis of pivot 1. The other flexible lines described below bend in the same manner, in one plane only. Flexible instrument line 35 attaches to rigid coupling 36, and flexible engine control line 37 attaches to rigid coupling 38, in passing through pivot 2. Other flexible cables may attach with these in flexibly bound bundles, employing similar couplings and similar rigid lines within panel 1. FIGURE 15 shows these flexible lines in solid line in the high speed position of pivot 2, and in dotted lines in the hovering position of pivot 2. Pivot 2 is rotated between these positions by crank arm 39 rigidly attached to pivot 2 and driven by conventional powered actuator 40, mounting to fuselage 18 on pivot 41.

In FIGURES 17, 18 and 19 the invention is applied to a passenger transport aircraft. Double deck figure eight fuselages 42 are employed containing passenger chairs 43. Between the upper and lower cabins in each fuselage is located bay 44 accommodating pivot 2, duct 29, and the associated structure just described, and serving also for structural mounting of the wing root of outer wing panel 22. Pivoted panel 45 functions for planing, thrusting and wing structure. It contains by-pass turbojet engines 46, consisting of an internal turbojet portion 47, the compressor of which drives shaft 48, which turns fan 49, driving air through passage 50, lying between turbojet engine 47 and casing 51. These engines 46 are mounted in a deep block-like arrangement within pivoted panel 45, permitting the lower leading edge of panel 45 to come into engagement with planing surface 3 when aligned for forward thrust. In the same manner the upper rearward external surface of panel 45 comes into engagement with planing surface 4. In these regions of mutual engagement studs 52 are provided on panel 45 and sockets 53 are provided on surfaces 3 and 4, preventing relative sliding movements between surfaces, these parts acting in conjunction with actuator 40 and its associated parts, locking the rigid structure of panel 45 to the rigid structure of surfaces 3 and 4 and imparting rigidity to the wing center section structure in torsion around a spanwise axis.

Twin-circle fuselages 42 conveniently afford a flat central plane between cabins for housing pivot 2 and its associated structure and a structural region in which to mount the wing roots of wing outer panels 22, and to absorb the loads imposed by pivot 2, as described.

The use of by-pass engines 46 incorporating powered internal fans 49 causes the mass flow rate of the propulsive stream to be increased per unit power of engine 47, increasing static thrust, and permitting correspondingly heavier loads to be supported in hovering flight. The admixture of the airflow driven by fan 49 rearwardly through duct 50 with the hot exhaust from engine 47 reduces both the temperature and velocity of the final exhaust stream, thereby avoiding the melting of asphalt runways, the thermal stress flaking of concrete runways, the risks of fires beneath the aircraft such as the exhaust-igniting of dry grass, the mechanical erosion of landing surfaces softened by heat and dispersed to the surroundings by mechanical air blast action, and reducing noise. Further, it produces a deep panel which facilitates the design of structural engaging mechanisms, such as studs 52 and sockets 53, to lock panel 45 to planing surfaces 3 and 4 in an integral structure when thrust acts forward.

Panel 45 in its forward thrusting alignment presents a block-like array of engines having a large frontal area normal to the airstream which consists almost wholly of air passages admitting air which passes through the panel and leaves its rear outlet port at a higher speed than it entered. The ducting features shown in FIGURE 8 wherein inlets 7 and ducts 12 are shown at the top of power panel 1 and duct 11 is at the bottom of that panel are repeated in power panel 45 but with inlets 7 and ducts 12 also at the bottom surface, in an inverted position. In the rear outlet port of panel 45 the outlets of ducts 12 are at both the top and bottom levels and the outlets of ducts 11 are located centrally between the outlets of ducts 12. Also inlets 7 and ducts 12 are employed on the sloping lateral sides of panel 45.

The aircraft shown in FIGURES 17 and 18 is relatively a slower type than the aircraft shown in FIGURES 1 through 13. A deep thrusting panel like panel 45 but lacking the by-pass feature in its engines could be employed profitably in a very fast aircraft employing the ram jet feature in ducts 11 to an increasing extent as speeds increase, thereby reducing or eliminating the high speed need for inlets 7 and ducts 12. Various other matters of relative importance influencing the application of this invention to a particular aircraft will be apparent to one skilled in the art: Subsonic aircraft may be arranged to achieve relatively greater wing spin. Power panels may be arranged with engines mounted in a deep group at the panel median center line (such as a seven engine hexagonal group) avoiding engines close to the lateral ends of the panel. In an extreme form such an aircraft could eliminate outer wing panels 22. Numerous other practical variations are possible without departing from the spirit of this invention.

I claim:

1. An aircraft comprising a center section wing structure in the form of a triplane and a fuselage member structurally attached to the three planing surfaces of the triplane, the lower planing surface of the triplane attaching on the fuselage member forward of the upper planing surface, the intermediate planing surface of the triplane mounting thrusting means and mounting a pivot rotatably connected in said fuselage member, said intermediate planing surface rotating in pitch on said pivot relative to said upper and lower planing surfaces of said triplane, said upper and lower planing surfaces and said fuselage member remaining structurally rigid relative to each other, said intermediate planing surface occupying a range of positions including a position thrusting in a direction substantially parallel to the planes of the upper and lower members of the triplane and a position thrusting in a direction substantially normal to the planes of the upper and lower members of the triplane.

2. An aircraft comprising two fuselages side by side and a center section wing structure structurally joining said fuselages, said center section wing structure comprising a pivoted panel carrying thrusting engines, said panel rotating relative to said fuselages on pivot members joining said panel to said fuselages, said panel occupying a range of positions around a horizontally extending pivot axis, said positions including a thrust direction parallel to the long axes of said fuselages and a thrust direction at right angles thereto, said center section wing structure further comprising aerodynamic surfaces having fixed positions relative to said fuselages, one of said surfaces structurally bridging between the upper portions of said fuselages aft of said pivot axis and another of said surfaces structurally bridging between the lower portions of said fuselages forward of said pivot axis.

3. An aircraft having a wing member comprising a rigid portion and a pivoted thrusting portion mounted in the midspan region of said rigid portion, said thrusting portion being pivoted about an axis transverse to the flight direction on pivot members joining said thrusting portion to said rigid portion of said wing member, said aircraft including structural members attached to the rigid portion of said wing member at the sides of said pivoted portion and other structural members attached to the aforesaid structural members passing forward and rearward of said thrusting portion, the axis of said pivot member lying linearly between said forward and rearward structural members, all of said structural members joining structurally forming a closed structural frame around said thrusting portion co-operating with said thrusting portion in carrying wing stresses across the region of said pivoted thrusting portion.

4. In an aircraft, a wing structure comprising a thrusting wing panel member pivoted around a spanwise axis, rigid structural members at both lateral extremities of said pivoted thrusting wing panel member, a bearing mounted in each of said rigid structural members rotatably receiving said pivoted wing panel member, and tensile structural members attached at their lateral extremities in said rigid members exerting forces on said rigid members in directions to draw said rigid members toward each other, the spanwise axis of said pivoted thrusting wing panel member lying linearly between said tensile structural members.

5. In a vertically rising aircraft, a wing structure mounted thereon, said wing structure having in the central region thereof a fixed structure mounted rigidly on said aircraft and a panel pivotally mounted on said aircraft about a spanwise axis, said panel taking vertically thrusting and forwardly thrusting positions, said panel containing an engine, said engine containing a lengthwise passage admitting combustion air at an intake mouth at its forward end and expelling combustion products at an exhaust port at its rearward end, said panel having a lengthwise air passage in addition to said engine combustion air passage, said additional passage conveying air propelled rearwardly by a fan rotated by said engine, said panel in its forwardly thrusting position having said intake mouth situated in the region above the leading portion of said fixed structure and having said exhaust port situated beneath the trailing portion of said fixed wing structure.

6. In an aircraft, a thrusting panel attached to said aircraft, said panel having an open front mouth admitting air and an open rear port exhausting air, said rear port being substantially equal in cross-stream area to said mouth, a wing surface attached to said aircraft, said thrusting panel exhausting air in a direction substantially parallel to the plane of said wing surface, said mouth of said panel admitting air passing internally through one or more engines installed internally within said panel and admitting air passing internally to said panel and externally to said engines, said rear port exhausting said air admitted at said mouth and exhausting air admitted at one or more cross-stream inlets opening through the exterior sides of said panel, said cross-stream inlet connecting through a cross-stream duct to an outlet exhausting at said rear port, said cross-stream duct encompassing one or more engine tail pipe outlets and extending downstream therefrom, engine exhaust air mixing with cross stream air prior to the issuance of the mixture through the cross-stream duct outlet in the open rear port of said panel, wherein engines are installed in multiple in a block-like array adjacent to said wing surface.

7. On an aircraft, two fuselage members side by side, a pivoted thrusting panel attached to both fuselage members and spanning laterally between them, a fixed position wing member rigidly attached to both fuselage members and spanning laterally between them, a fixed position tail surface member rigidly attached to each of said fuselages, all three said fixed position wing and tail surface members lying in different geometric planes, each of the two said tail surface members being attached at its root end to one of said fuselages each to a different fuselage and being attached at its tip end to the corresponding tip end of the corresponding tail surface member attached to the other fuselage, said tail surface members joining rigidly in the form of a dihedral angle, said three fixed position wing and tail members co-operating structurally with said fuselages and said pivoted thrusting panel to produce a rigid structure.

8. On a supersonic aircraft a thrusting and lifting wing structure attached to said aircraft, said structure comprising wing surfaces having substantial lateral span lying in planes substantially parallel to each other, said wing surfaces including a more forward wing surface lying in a lower plane than a more rearward wing surface, said more forward wing surface housing thrusting means exhausting propulsive reaction gases rearwardly from multiple exhaust ports in the trailing portion thereof at points forward of and beneath the trailing portion of the more rearward wing surface, said multiple exhaust ports being located laterally across substantially the whole span of said more forward wing member, thereby obtaining lift across the span of said more rearward wing surface, from shock wave reflection.

9. An aircraft comprising a fuselage member and a wing member attached thereto, said wing member comprising planing surfaces attached rigidly to said fuselage member and a thrusting panel member attached pivotally in pitch to said fuselage member, said rigidly attached planing surfaces comprising a wing tip panel member located toward either lateral extremity of the aircraft and wing center section planing members structurally bridging laterally between said wing tip members, said wing center section planing members comprising a forward member and a rearward member, the pivot axis of said thrusting panel member lying laterally between said wing tip panel members and linearly between said forward and rearward center section planing members.

10. In a vertically rising aircraft, a fuselage, a thrusting wing panel pivotally mounted in pitch at the side of said fuselage, a fixed position aerodynamic planing surface rigidly attached to said fuselage, said thrusting panel engaging said fixed position planing surface when said thrusting panel is in a forwardly thrusting position, and locking means attached to said planing surface and to said pivoted panel in the region of mutual engagement structurally locking said pivoted thrusting wing panel to said planing surface when said thrusting panel is in a forwardly thrusting position.

11. In a vertically rising aircraft, a fuselage member in a horizontal position, a wing member in a horizontal position rigidly attached to said fuselage member, an engine member pivotally attached in pitch to said aircraft within the overall planview outline of said wing member, said engine member having an intake mouth forward and an exhaust port rearward, said engine member taking a position thrusting forwardly in a horizontal direction, said intake mouth at that time being located above the upper surface of the forward-lying part of said wing member, and said exhaust port at that time being located beneath the lower surface of the rearward-lying part of said wing member.

12. In a vertically rising aircraft, a fuselage, a wing panel pivotally attached to said fuselage, thrusting engines rigidly attached to said wing panel, said wing panel tilting through a range of positions around a horizontal pivot axis including a thrusting direction parallel to the long axis of said fuselage and a thrusting position at right angles thereto, a thrusting tail pipe rigidly attached to said engine, a faired front wing structure rigidly attached to said wing panel, an air duct rigidly attached to said wing panel, a downstream end on said air duct surrounding the exhaust port of said tail pipe, an upstream end on said air duct opening flush to the faired external upper aerodynamic lifting surface of said tilting wing panel in a region downstream from said faired front wing structure, whereby non-stalled aerodynamic flow is preserved on the upper surface of said wing panel.

References Cited in the file of this patent

UNITED STATES PATENTS

| | | |
|---|---|---|
| 1,939,682 | Fleming | Dec. 19, 1933 |
| 2,023,334 | Marmonier | Dec. 3, 1935 |
| 2,450,821 | Zimmerman | Oct. 5, 1948 |
| 2,461,805 | Barker | Feb. 15, 1949 |
| 2,665,083 | Custer | Jan. 5, 1943 |
| 2,696,079 | Kappus | Dec. 7, 1954 |
| 2,734,698 | Straayer | Feb. 14, 1956 |
| 2,780,058 | Beale et al. | Feb. 5, 1957 |
| 2,780,424 | Price | Feb. 5, 1957 |
| 2,930,544 | Howell | Mar. 29, 1960 |

FOREIGN PATENTS

| | | |
|---|---|---|
| 383,494 | Great Britain | Nov. 17, 1932 |
| 1,065,631 | France | Jan. 13, 1954 |
| 1,090,777 | France | Oct. 20, 1954 |